United States Patent
Salter et al.

(10) Patent No.: US 12,005,790 B2
(45) Date of Patent: Jun. 11, 2024

(54) BIDIRECTIONAL ENERGY TRANSFER SYSTEMS AND METHODS FOR PROVIDING AGGREGATED POWER OUTAGE MAPPING

(71) Applicant: FORD GLOBAL TECHNOLOGIES, LLC, Dearborn, MI (US)

(72) Inventors: Stuart C. Salter, White Lake, MI (US); Ryan O'Gorman, Beverly Hills, MI (US); Peter Phung, Windsor (CA); Katherine Howard-Cone, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 382 days.

(21) Appl. No.: 17/392,737

(22) Filed: Aug. 3, 2021

(65) Prior Publication Data

US 2023/0043446 A1 Feb. 9, 2023

(51) Int. Cl.
*B60L 53/14* (2019.01)
*B60L 53/60* (2019.01)
*G01C 21/34* (2006.01)
*G06Q 50/06* (2012.01)
*H02J 3/00* (2006.01)
*H02J 3/01* (2006.01)

(52) U.S. Cl.
CPC .............. *B60L 53/14* (2019.02); *B60L 53/60* (2019.02); *G01C 21/3461* (2013.01); *G06Q 50/06* (2013.01); *H02J 3/001* (2020.01)

(58) Field of Classification Search
CPC ........... B60L 2240/622; B60L 2240/66; B60L 2250/10; B60L 2250/16; B60L 2260/52; B60L 2260/54; B60L 53/14; B60L 53/60; B60L 53/63; B60L 53/68; B60L 55/00; B60L 58/01; G01C 21/3461; G01C 21/3469; G06Q 50/06; H02J 3/001; Y02T 10/70; Y02T 10/7072; Y02T 90/12; Y02T 90/16
See application file for complete search history.

(56) References Cited

U.S. PATENT DOCUMENTS

| | | | |
|---|---|---|---|
| 8,838,385 B2 | 9/2014 | Van Wiemeersch | |
| 8,898,278 B2 | 11/2014 | Bridges et al. | |
| 10,245,968 B2* | 4/2019 | O'Connell | ............. B60L 53/63 |
| 10,906,425 B2 | 2/2021 | Herman et al. | |
| 2015/0298565 A1* | 10/2015 | Iwamura | ................ G06Q 10/04 701/22 |

(Continued)

FOREIGN PATENT DOCUMENTS

| | | |
|---|---|---|
| JP | 2012220289 A | 11/2012 |
| JP | 2019008339 A | 1/2019 |

*Primary Examiner* — Tyler J Lee
(74) *Attorney, Agent, or Firm* — David B. Kelley; Carlson, Gaskey & Olds, P.C.

(57) ABSTRACT

Systems and methods may coordinate and provide bidirectional energy transfer events between electrified vehicles and other vehicles, devices, and/or structures. A power outage map can automatically be generated in response to a power outage condition of a grid power source. Both a power outage zone and a predicted power outage zone may be identified within the power outage map. A notification, alternative drive route recommendation, etc. may be sent to users of the bidirectional energy transfer system who are operating their vehicles near the power outage zone or the predicted power outage zone.

20 Claims, 7 Drawing Sheets

(56) References Cited

U.S. PATENT DOCUMENTS

| | | | | |
|---|---|---|---|---|
| 2016/0193932 A1* | 7/2016 | Vaghefinazari | ....... | H02J 7/0029 |
| | | | | 320/109 |
| 2017/0123421 A1* | 5/2017 | Kentley | ............... | G05D 1/0088 |
| 2019/0028904 A1* | 1/2019 | Carpenter | ............ | G08G 5/0082 |
| 2019/0039470 A1* | 2/2019 | Moghe | .................... | B60L 53/39 |
| 2019/0308509 A1* | 10/2019 | Herman | .................. | B60L 53/35 |

\* cited by examiner

BIDIRECTIONAL ENERGY TRANSFER SYSTEMS AND METHODS FOR PROVIDING AGGREGATED POWER OUTAGE MAPPING

TECHNICAL FIELD

This disclosure is directed to systems and methods for coordinating and providing bidirectional energy transfer aggregated power outage mapping in response to grid power outage conditions.

BACKGROUND

Electrified vehicles differ from conventional motor vehicles because they are selectively driven by one or more traction battery pack powered electric machines. The electric machines can propel the electrified vehicles instead of, or in combination with, an internal combustion engine. Plug-in type electrified vehicles include one or more charging interfaces for charging the traction battery pack. Plug-in type electrified vehicles are typically charged while parked at a charging station or some other utility power source. Charging electrified vehicles can become challenging during electrical grid power outage conditions.

SUMMARY

A bidirectional energy transfer system according to an exemplary aspect of the present disclosure includes, among other things, an electrified vehicle configured to broadcast vehicle information that includes at least a location and a charging status of the electrified vehicle, and a server system in communication with the electrified vehicle and configured to receive the vehicle information. The server system includes a control module programmed to generate a power outage map when the charging status indicates a power outage condition.

In a further non-limiting embodiment of the foregoing system, the power outage map includes a power outage zone and a predicted power outage zone identified within a street map of the power outage map.

In a further non-limiting embodiment of either of the foregoing systems, the power outage zone is demarcated by a first type of shading and the predicted power outage zone is demarcated by a second type of shading that is different from the first type of shading.

In a further non-limiting embodiment of any of the forgoing systems, the control module is further programmed to infer the predicted power outage zone based on branches of a power grid overlay that are located downstream from the power outage zone within the street map.

In a further non-limiting embodiment of any of the forgoing systems, the control module is further programmed to automatically communicate the power outage map to a service provider of a grid power source for indicating the location of the power outage condition.

In a further non-limiting embodiment of any of the forgoing systems, the control module is further programmed to increase a charging storage limit of a traction battery pack of the electrified vehicle in response to predicting that the power outage condition is imminent.

In a further non-limiting embodiment of any of the forgoing systems, the power outage map is an aggregated power outage map generated based on the charging status of the electrified vehicle and a second charging status of a second electrified vehicle.

In a further non-limiting embodiment of any of the forgoing systems, the control module is further programmed to communicate the power outage map to a second electrified vehicle that is located near a power outage zone that is identified within the power outage map.

In a further non-limiting embodiment of any of the forgoing systems, the vehicle information is periodically broadcast from the electrified vehicle in the form of heartbeat status signals.

In a further non-limiting embodiment of any of the forgoing systems, the control module is further programmed to notify a user of the electrified vehicle when the location of the electrified vehicle is within a power outage zone or a predicted power outage zone of the power outage map and provide a list of available charging locations for charging the electrified vehicle or provide travel route instructions for guiding the user back to a home location associated with the electrified vehicle.

A method according to another exemplary aspect of the present disclosure includes, among other things, receiving vehicle information associated with an electrified vehicle, detecting, based at least on the vehicle information, whether a power outage condition is occurring at a location of the electrified vehicle, and generating a power outage map in response to detecting the power outage condition.

In a further non-limiting embodiment of the foregoing method, generating the power outage map includes identifying a power outage zone of the power outage map with a first type of shading, and identifying a predicted power outage zone of the power outage map with a second type of shading that is different from the first type of shading.

In a further non-limiting embodiment of either of the foregoing methods, identifying the predicted power outage zone includes inferring the predicted power outage zone based on branches of a power grid overlay that are located downstream from the power outage zone within the power outage map.

In a further non-limiting embodiment of any of the foregoing methods, the method includes automatically communicating the power outage map to a service provider of a grid power source.

In a further non-limiting embodiment of any of the foregoing methods, the method includes communicating the power outage map to a second electrified vehicle that is located near a power outage zone that is identified within the power outage map.

In a further non-limiting embodiment of any of the foregoing methods, the vehicle information is periodically broadcast from the electrified vehicle in the form of heartbeat status signals.

In a further non-limiting embodiment of any of the foregoing methods, the method includes notifying a user of the electrified vehicle when the electrified vehicle is within a power outage zone or a predicted power outage zone of the power outage map and providing a list of available charging locations for charging the electrified vehicle.

In a further non-limiting embodiment of any of the foregoing methods, the method includes notifying a user of the electrified vehicle when the electrified vehicle is within a power outage zone or a predicted power outage zone of the power outage map, and providing travel route instructions for guiding the user back to a home location associated with the electrified vehicle.

In a further non-limiting embodiment of any of the foregoing methods, the method includes determining whether the power outage condition is imminent, charging a traction battery pack of the electrified vehicle to a first charging storage limit when the power outage condition is not imminent, and charging the traction battery pack to a second, larger charging storage limit when the power outage condition is imminent.

In a further non-limiting embodiment of any of the foregoing methods, the method includes providing a strategic charging guidance notification to a user of the electrified vehicle in conjunction with providing the power outage map.

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure relates to systems and methods for coordinating and providing bidirectional energy transfer events between electrified vehicles and other vehicles, devices, and/or structures. A power outage map can automatically be generated in response to a power outage condition of a grid power source. Both a power outage zone and a predicted power outage zone may be identified within the power outage map. A notification, alternative drive route recommendation, etc. may be sent to users of the bidirectional energy transfer system who are operating their vehicles near the power outage zone or the predicted power outage zone. These and other features of this disclosure are discussed in greater detail in the following paragraphs of this detailed description.

Figure 1:
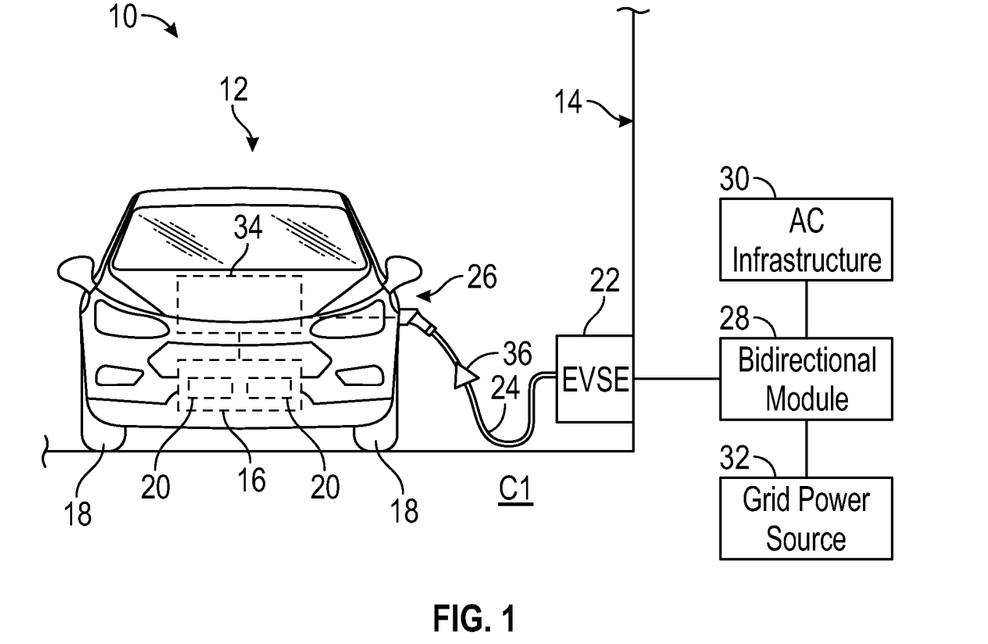
FIG. 1 schematically illustrates a first configuration of a bidirectional energy transfer system.
Figure 2:
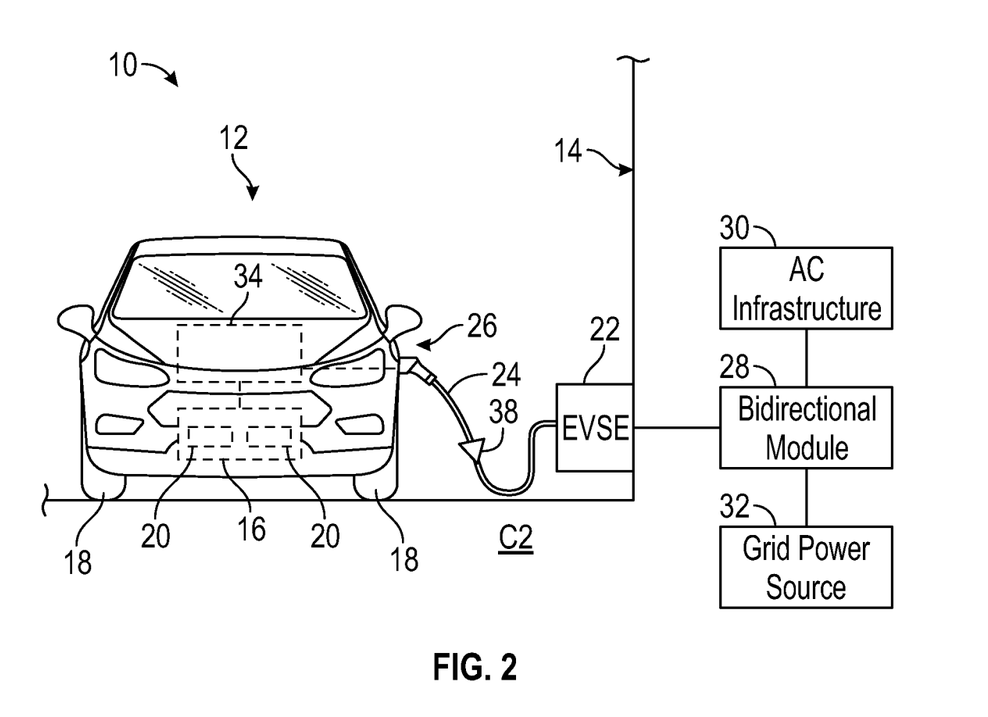
FIG. 2 schematically illustrates a second configuration of the bidirectional energy transfer system of FIG. 1.

FIGS. 1 and 2 schematically illustrate an exemplary bidirectional energy transfer system 10 (hereinafter "the system 10") for bidirectionally transferring energy between an electrified vehicle 12 and a structure 14. The system 10 enables the bidirectional transfer of energy from the electrified vehicle 12 to the structure 14 or vice versa. The structure 14 may be a residential building, a commercial building, a parking garage, a charging station, or any other type of structure that is capable of receiving or transferring energy. In an embodiment, the structure 14 is a garage of a residential home that functions as a "home location" of the electrified vehicle 12.

Although a specific component relationship is illustrated in the figures of this disclosure, the illustrations are not intended to limit this disclosure. The placement and orientation of the various components of the depicted vehicles are shown schematically and could vary within the scope of this disclosure. In addition, the various figures accompanying this disclosure are not necessarily drawn to scale, and some features may be exaggerated or minimized to emphasize certain details of a particular component.

In an embodiment, the electrified vehicle 12 is a plug-in type electrified vehicle (e.g., a plug-in hybrid electric vehicle (PHEV) or a battery electric vehicles (BEV)). The electrified vehicle 12 includes a traction battery pack 16. The electrified vehicle 12 may include an electrified powertrain capable of applying a torque from an electric machine (e.g., an electric motor) for driving drive wheels 18 of the electrified vehicle 12. Therefore, the powertrain of the electrified vehicle 12 may electrically propel the set of drive wheels 18 either with or without the assistance of an internal combustion engine.

The electrified vehicle 12 of FIG. 1 is schematically illustrated as a car. However, other vehicle configurations are also contemplated. The teachings of this disclosure may be applicable for any type of vehicle as the electrified vehicle 12. For example, the electrified vehicle 12 could be configured as a car, a truck, a van, a sport utility vehicle (SUV), etc.

Although shown schematically, the traction battery pack 16 may be configured as a high voltage traction battery pack that includes a plurality of battery arrays 20 (i.e., battery assemblies or groupings of battery cells) capable of outputting electrical power to one or more electric machines of the electrified vehicle. Other types of energy storage devices and/or output devices may also be used to electrically power the electrified vehicle 12.

The electrified vehicle 12 may interface with the structure 14 through an electric vehicle supply equipment (EVSE) 22 in order to perform bidirectional energy transfers of the system 10. In an embodiment, the EVSE 22 is a wall mounted charging unit, although other implementations are also contemplated. A charge cable 24 may operably connect the EVSE 22 to a charge port assembly 26 of the electrified vehicle 12 for transferring energy between the electrified vehicle 12 and the structure 14. The charge cable 24 may be configured to provide any level of charging (e.g., Level 1 AC charging, Level 2 AC charging, DC charging, etc.).

The EVSE 22 may be operably connected to an AC infrastructure 30 of the structure 14 through a bidirectional energy transfer module 28. Although shown separately from the EVSE 22 in FIG. 1, the bidirectional energy transfer module 28 and the EVSE 22 could be integrated together as part of common module. Various electrical loads, such as common household loads, for example, may be associated with the AC infrastructure 30.

Power from a grid power source 32 (e.g., AC power, solar power, wind power, or combinations thereof) and/or power from the electrified vehicle 12 may be communicated to the bidirectional energy transfer module 28. The bidirectional energy transfer module 28 is configured to aid the establishment of bidirectional transfers of electrical energy between the electrified vehicle 12 and the structure 14. The bidirectional energy transfer module 28 may include various equipment, including but not limited to an AC/DC converter, a common HVDC bus, an isolation transformer, a DC/DC converter, a control module, etc. for configuring the structure 14 to either receive electrical energy from the electrified vehicle 12 or send electrical energy to the electrified vehicle 12. The bidirectional energy transfer module 28 may further be configured to transfer energy from the grid power source 32 to the AC infrastructure 30.

The electrified vehicle 12 may include a bidirectional power transfer system 34 configured for further enabling the bidirectional transfer of power between the electrified vehicle 12 and the structure 14. The bidirectional power transfer system 34 may be operably connected between the charge port assembly 26 and the traction battery pack 16 of the electrified vehicle 12. The bidirectional power transfer system 34 may include various equipment, such as a charger, a converter, a motor controller (which may be referred to as an inverter system controller or ISC), etc. for configuring the electrified vehicle 12 for either receiving electrical energy from the structure 14 or communicating electrical energy to the structure 14.

In another embodiment, the bidirectional power transfer system 34 is additionally configured to transfer energy between the traction battery pack 16 and one or more electric motors of the electrified vehicle 12. In yet another embodiment, the bidirectional power transfer system 34 is additionally configured for enabling the bidirectional transfer of power between the electrified vehicle 12 and another electrified vehicle that is equipped to perform bidirectional energy transfers.

One non-limiting example of a suitable bidirectional power transfer system that may be employed for use within the electrified vehicle 12 for achieving bidirectional power transfers is disclosed within US Patent Publication No. 2020/0324665, assigned to Ford Global Technologies, LLC, the disclosure of which is herein incorporated by reference. However, other bidirectional power transfer systems could also be utilized for achieving the bidirectional transfer of power within the scope of this disclosure.

FIG. 1 schematically illustrates a first configuration C1 of the system 10. During the first configuration C1, power may be transferred from the structure 14 to the electrified vehicle 12, such as for charging the traction battery pack 16 of the electrified vehicle 12. The direction of energy transfer during the first configuration C1 is schematically depicted by arrow 36.

FIG. 2 schematically illustrates a second configuration C2 of the system 10. During the second configuration C2, power may be transferred from the traction battery pack 16 of the electrified vehicle 12 to the structure 14. The direction of energy transfer during the second configuration C2 is schematically illustrated by arrow 38. In this way, the electrified vehicle 12 may be employed as a backup energy storage system for powering electrical loads of the structure 14 when power from the grid power source 32 is temporarily unavailable, such as during electrical blackouts, for example.

Figure 3:
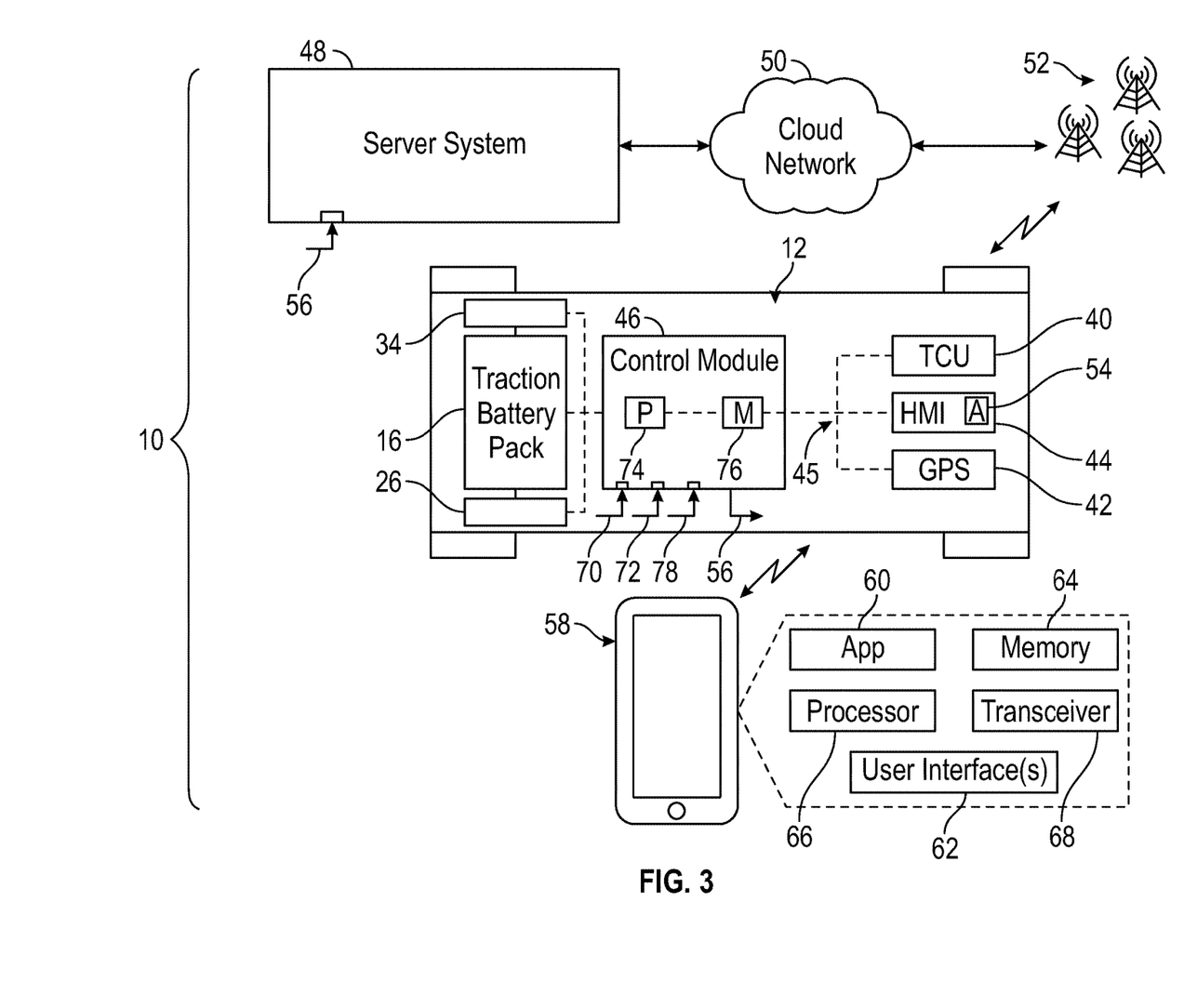
FIG. 3 schematically illustrates exemplary aspects of a bidirectional energy transfer system.

Additional aspects of the system 10 of FIGS. 1-2 are further detailed in FIG. 3. In particular, FIG. 3 schematically illustrates features that enable the system 10 to coordinate bidirectional energy transfer related events between the electrified vehicle 12 and other devices or structures (e.g., the structure 14, another electrified vehicle, etc.) based, at least in part, on power outage conditions of the grid power source 32.

As further part of the system 10, the electrified vehicle 12 may include a telecommunications module 40, a global positioning system (GPS) 42, a human machine interface (HMI) 44, and a control module 46. These and other components may be interconnected and in electronic communication with one another over a communication bus 45 of the electrified vehicle 12. The communication bus 45 may be a wired communication bus such as a controller area network (CAN) bus, or a wireless communication bus such as Wi-Fi, Bluetooth®, Ultra-Wide Band (UWB), etc.

The telecommunications module 40 may be configured for achieving bidirectional communications with a cloud-based server system 48 of the system 10. The telecommunications module 40 may communicate over a cloud network 50 (e.g., the internal to obtain various information stored on the server system 48 or to provide information to the server system 48 that can subsequently be accessed by the electrified vehicle 12 (and/or other participating vehicles or structures of the system 10). The server system 48 can identify, collect, and store user data associated with the electrified vehicle 12 for validation purposes. Upon an authorized request, data may be subsequently transmitted to the telecommunications module 40 via one or more cellular towers 52 or some other known communication technique (e.g., Wi-Fi, Bluetooth®, data connectivity, etc.). The telecommunications module 40 can receive data from the server system 48 or can communicate data back to the server system 48 via the cellular tower(s) 52. Although not necessarily shown or described in this highly schematic embodiment, numerous other components may enable bidirectional communications between the electrified vehicle 12 and the server system 48. Moreover, the server system 48 may include various servers that store data that may be accessed by the system 10.

In a first embodiment, a user/owner of the electrified vehicle 12 may interface with the server system 48 for coordinating bidirectional energy transfer related events using the HMI 44. For example, the HMI 44 may be equipped with an application 54 (e.g., FordPass™ or another similar web-based application) for interfacing with the server system 48. The HMI 44 may be located within a passenger cabin of the electrified vehicle 12 and may include various user interfaces for displaying information to the vehicle occupants and for allowing the vehicle occupants to enter information into the HMI 44. The vehicle occupants may interact with the user interfaces presentable on the HMI 44 via touch screens, tactile buttons, audible speech, speech synthesis, etc.

In another embodiment, the user/owner of the electrified vehicle 12 could alternatively or additionally interface with the server system 48 for coordinating bidirectional energy transfer related events using a personal electronic device 58 (e.g., a smart phone, tablet, computer, wearable smart device, etc.). The personal electronic device 58 may include an application 60 (e.g., FordPass™ or another similar application) that includes programming to allow the user to employ one or more user interfaces 62 for setting or controlling certain aspects of the system 10. The application 60 may be stored in a memory 64 of the personal electronic device 58 and may be executed by a processor 66 of the personal electronic device 58. The personal electronic device 58 may additionally include a transceiver 68 that is configured to communicate with the server system 48 over the cellular tower(s) 52 or some other wireless link.

The GPS 42 is configured to pinpoint locational coordinates of the electrified vehicle 12. The GPS 42 may utilize geopositioning techniques or any other satellite navigation techniques for estimating the geographic position of the electrified vehicle 12 at any point in time.

The control module 46 may include both hardware and software and could be part of an overall vehicle control system, such as a vehicle system controller (VSC), or could alternatively be a stand-alone controller separate from the VSC. In an embodiment, the control module 46 is programmed with executable instructions for interfacing with and commanding operation of various components of the system 10. Although shown as separate modules within the highly schematic depiction of FIG. 3, the telecommunications module 40, the GPS 42, the HMI 44, and the control module 46 could be integrated together as part of common module of the electrified vehicle 12.

The control module 46 may include a processor 74 and non-transitory memory 76 for executing various control strategies and modes associated with the system 10. The processor 74 can be a custom made or commercially available processor, a central processing unit (CPU), or generally any device for executing software instructions. The memory 76 can include any one or combination of volatile memory elements and/or nonvolatile memory elements.

The processor 74 may be operably coupled to the memory 76 and may be configured to execute one or more programs stored in the memory 76 of the control module 46 based on the various inputs received from other devices, such as the server system 48, the telecommunications module 40, the GPS 42, the HMI 44, the traction battery pack 16, etc. In an embodiment, the application 54 (e.g., FordPass™ or another similar application), which includes programming for allowing the vehicle user to employ one or more user interfaces within the HMI 44 for setting or controlling certain aspects of the system 10, may be stored in the memory 76 and may be executed by the processor 74 of the control module 46. Alternatively, the control module 46 may be configured to communicate and interface with the personal electronic device 58 for coordinating and/or executing certain aspects of the system 10.

The control module 46 may receive and process various inputs in preparation for providing vehicle information 56 to the server system 48 during bidirectional energy transfer sequences of the system 10. The vehicle information 56 may then be utilized by the server system 48 for performing aggregated power outage mapping functions, for example.

In an embodiment, the vehicle information 56 may be regularly broadcast at predefined time intervals to the server system 48 as part of a "heartbeat" status signal. The heartbeat status signals may be broadcast during bidirectional energy transfer sequences in which the electrified vehicle 12 is operably connected to the structure 14 (or any other charging-enabled structure) via the EVSE 22 for exchanging energy therebetween. However, the vehicle information 56 may also be communicated to the server system 48 during off-plug conditions, such as when the electrified vehicle 12 is away from the structure 14.

A first input to the control module 46 may include battery data 70 received from the traction battery pack 16. The battery data 70 may include battery-related information such as the state of charge (SOC) percentage of the traction battery pack, the available travel range (e.g., in miles or kilometers), etc.

A second input to the control module 46 may include location data 72 received from the GPS 42. The location data 72 may include a current location of the electrified vehicle 12. The location data 72 may be leveraged to identify the charging location where the electrified vehicle 12 is currently being charged, or, if not currently being charged, the locations of the nearest charging-enabled structures.

A third input to the control module 46 may include energy transfer status information 78 received from the bidirectional power transfer system 34 and/or the charge port assembly 26. The energy transfer status information 78 may be leveraged to determine whether the electrified vehicle 12 is currently engaged in an energy transfer event, whether the electrified vehicle is "on-plug" (e.g., whether or not the charge cable 24 is currently plugged into the charge port assembly 26) but no energy transfer is occurring (e.g., due to a power outage), whether the electrified vehicle is "off-plug," etc.

The control module 46 may aggregate the data from each of the inputs into the vehicle information 56. The vehicle information 56 may then be regularly communicated to the server system 48 in the form of heartbeat status signals for additional analysis.

Figure 4:
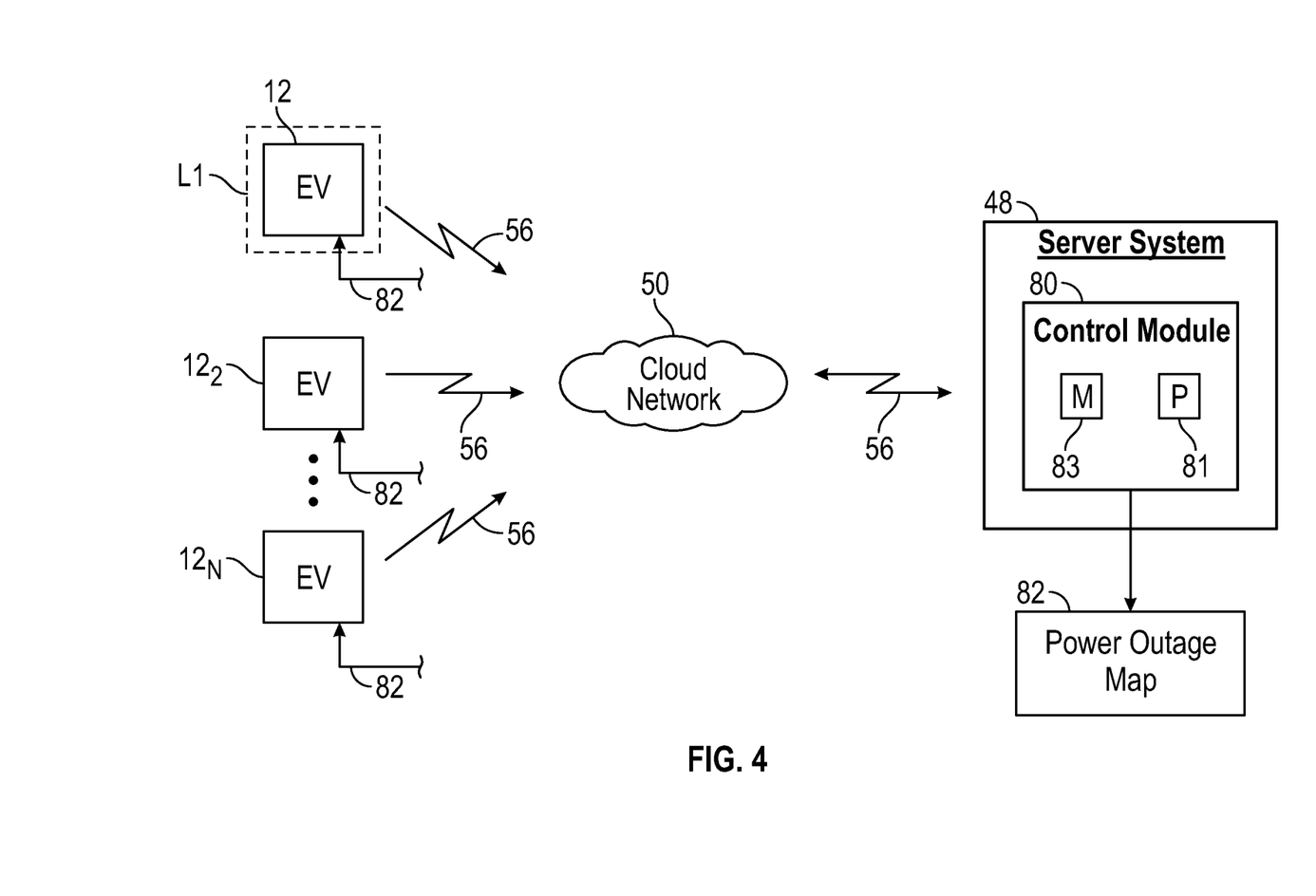
FIG. 4 schematically illustrates additional exemplary aspects of a bidirectional energy transfer system.

Referring now primarily to FIG. 4, a control module 80 of the server system 48 may be configured to receive vehicle information 56 from the electrified vehicle 12 and any other electrified vehicle $12_2$ to $12_N$ (where "N" is any number) that is operably linked to the system 10. The control module 80 may be programmed to process the vehicle information 56 for performing various power outage mapping-related actions.

The control module 80 of the server system 48 may include a processor 81 and memory 83 that is operably connected to the processor 81. Programming (e.g., software code) may be stored as executable instructions in the memory 83, and the executable instructions may be embodied within any computer readable medium that can be executed by the processor 81.

In an embodiment, the control module 80 is programmed to leverage the vehicle information 56 for performing aggregated power outage mapping functions. For example, when the vehicle information 56 indicates a loss of power while performing energy transfer events at a charging location $L_1$ of the electrified vehicle 12, the control module 80 may automatically generate a power outage map 82 for indicating the location of the power outage. The power outage map 82 may be automatically communicated to the service provider associated with the grid power source 32 for indicating the location of the power outage without any necessary actions being taken by the user associated with the electrified vehicle 12. The power outage map 82 may also be communicated to the electrified vehicle 12 and to one or more additional electrified vehicles $12_2$ to $12_N$ who may be located at charging locations that could be affected by the detected power outage. The power outage map 82 may be displayed on the HMI 44 and/or the personal electronic device 58 associated with each respective vehicle 12 to $12_N$, for example.

In some instances, the charging location $L_1$ of the electrified vehicle 12 may be the structure 14, such as when the electrified vehicle 12 is charging or transferring energy while at home. The charging location $L_1$ could alternatively be at any other charging-enabled structure, such as any public charging station, when the electrified vehicle 12 is charging or transferring energy while away from home.

Figure 5:
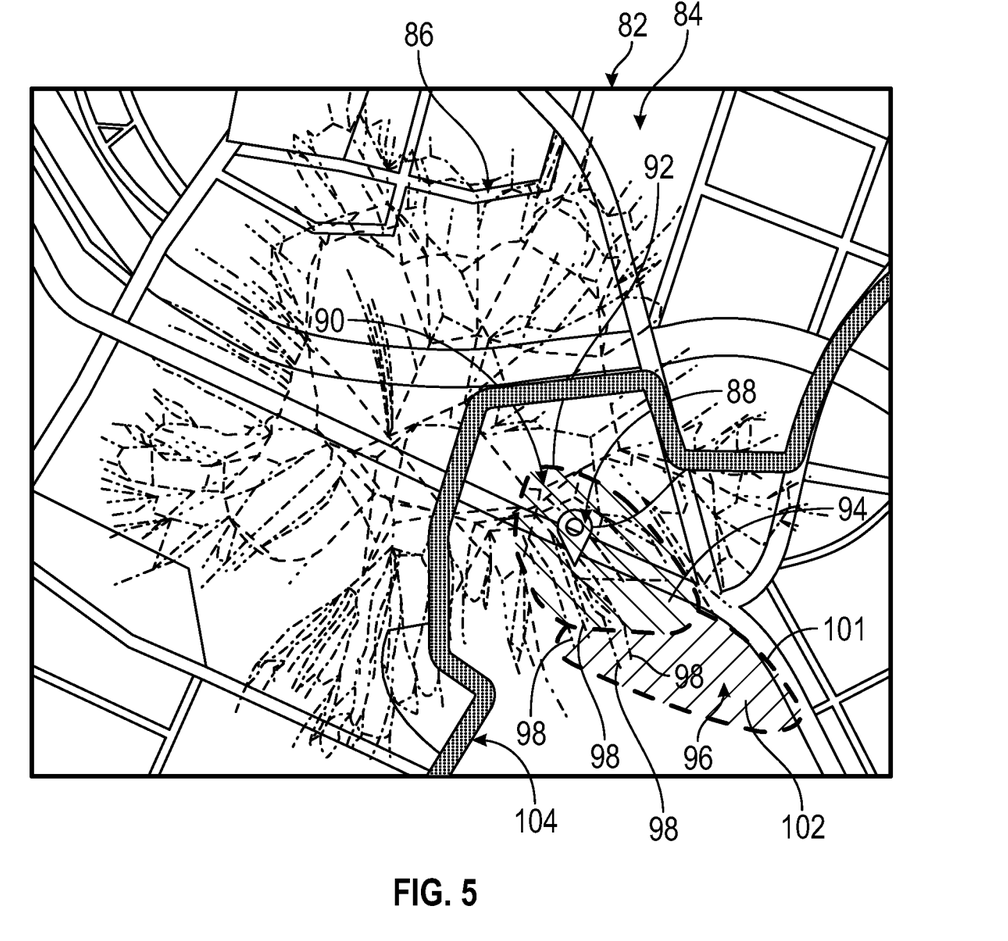
FIG. 5 illustrates an exemplary power outage map that can be generated by a bidirectional energy transfer system.

An exemplary power outage map 82 is illustrated in FIG. 5. The power outage map 82 may include a street map 84 and a power grid overlay 86. The power grid overlay 86 is representative of a network of power line branches associated with the grid power source 32. The power grid overlay 86 may be overlaid onto the street map 84 to provide a visual indication of the various branches. A location of a detected power outage may be marked within a power outage location indicator 88 within the power outage map 82.

A power outage zone 90 may also be indicated within the power outage map 82. The power outage zone 90 may indicate the area of the street map 84 that is affected by the detected power outage. The power outage zone 90 may be delineated by an outer border 92 and shading 94. In an embodiment, the outer border 92 is a dashed line and the shading 94 is a red colored shading. However, other configurations are also possible within the scope of this disclosure.

A predicted power outage zone 96 may further be indicated within the power outage map 82. The predicted power outage zone 96 may indicate the area of the street map 84 that is likely to be affected by the known power outage. In an embodiment, the predicted power outage zone 96 is inferred by identifying branches 98 of the power grid overlay 86 that are located downstream from the power outage zone 90. The predicted power outage zone 96 may be delineated by an outer border 101 and shading 102. In an embodiment, the outer border 101 is a dashed line and the shading 102 is a different colored shading (e.g., an amber colored shading, etc.) than the shading 94 associated with the power outage zone 90. However, other configurations are also possible within the scope of this disclosure.

Referring now generally to FIGS. 3-5, the control module 80 of the server system 48 may be programmed to communicate the power outage map 82 to the electrified vehicle 12 (and any other affected electrified vehicles $12_2$ to $12_N$ that are operably linked to the system 10) either immediately or in a delayed fashion. The decision to delay the notification of the power outrage map 82 may be based on various factors including but not limited to the time of the day, the expected duration of the power outage, movement of the user's personal electronic device 58, the current SOC of the vehicle, the location of the vehicle, etc. The user of the electrified vehicle 12 may input certain settings related to when it is appropriate to be notified of the power outage map 82 within the application 54 of the HMI 44 or the application 60 of the personal electronic device 58, for example.

The control module 80 may further be programmed to provide strategic charging guidance to the users of affected electrified vehicles 12 to $12_N$, either separately or in conjunction with providing the power outage map 82. The decision to provide the strategic charging guidance may be based, at least in part, on the current location of the electrified vehicle 12 (e.g., home versus away from home), the location of the power outage, planned drive route information, the current SOC of the traction battery pack 16, etc.

The strategic charging guidance may be designed to minimize charging disruptions of the electrified vehicle 12 or other affected vehicles $12_N$ of the system 10 by minimizing the probability that the electrified vehicle 12 is located within a power outage environment. In an embodiment, providing the strategic charging guidance includes recommending charging locations for charging the electrified vehicle 12 that are located outside the power outage zone 90 and outside the predicted power outage zone 96.

In another embodiment, providing the strategic charging guidance includes displaying an alternative travel route 104 (see FIG. 5) on the power outage map 82. The alternative travel route 104 may include turn-by-turn instructions for avoiding the power outage zone 90 and/or the predicted power outage zone 96 from the current location of the electrified vehicle 12.

In yet another embodiment, providing the strategic charging guidance may include assessing the power required to travel to the home location versus charging at the nearest charging location that is outside of the power outage zone 90, the amount of time required for traveling to the home location and charging versus charging at the current location, the vehicle user's typical schedule, current traffic conditions, etc. These and other factors can be presented to the user via the HMI 44 and/or the personal electronic device 58 in order to help them decide whether or not to charge the traction battery pack 16 before returning to the home location, such as when the home location is located within the power outage zone 90, for example.

In yet another embodiment, providing the strategic charging guidance may include instructing the electrified vehicle 12 to immediately charge the traction battery pack 16, such as in preparation for imminent severe weather/power outage conditions. In response to receiving such an instruction, the control module 46 of the electrified vehicle 12 may automatically command an increase of a charging storage limit associated with the traction battery pack 16. For example, the charging storage limit of the traction battery pack 16 may be temporarily raised from 80% to 100% to allow for a greater amount of energy to be stored in the traction battery pack 16 in anticipation of the power outage conditions.

The various prompts/instructions/alerts that are commanded by the control module 80 as part of the power outage map 82 and/or the strategic charging guidance may be displayed as one or more messages on the HMI 44 or the personal electronic device 58, for example.

In an embodiment, the control module 46 of the electrified vehicle 12 may be programmed to command various outputs in response to receiving the power outage map 82 and/or the strategic charging guidance. For example, the control module 46 may be configured to interface with and/or control the functionality of the bidirectional power transfer system 34 and the bidirectional energy transfer module 28 for coordinating and commanding either the first configuration C1 or the second configuration C2 during bidirectional energy transfer sequences.

Figure 6:
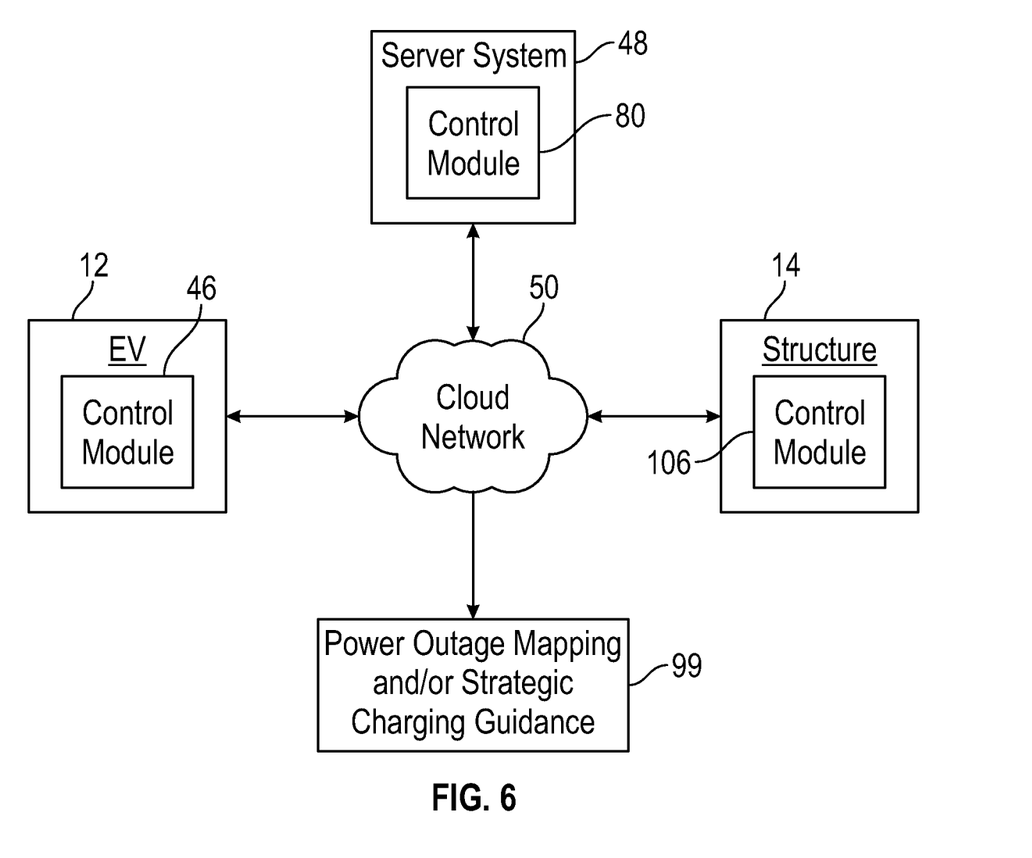
FIG. 6 schematically illustrates another exemplary bidirectional energy transfer system.

In the embodiments described above, the control module 80 of the server system 48 may be configured to function as the communications hub of the system 10 for coordinating and providing aggregated power outage mapping. However, other embodiments are also contemplated within the scope of this disclosure. For example, as shown in FIG. 6, the control module 46 of the electrified vehicle 12, a control module 106 of the structure 14, and the control module 80 of the server system 48 may operate together over the cloud network 50 to establish a control system for controlling the functionality of the system 10, such as for coordinating and providing the aggregated power outage mapping functionality and/or the strategic charging guidance (schematically shown at block 99), for example.

Figure 7A:
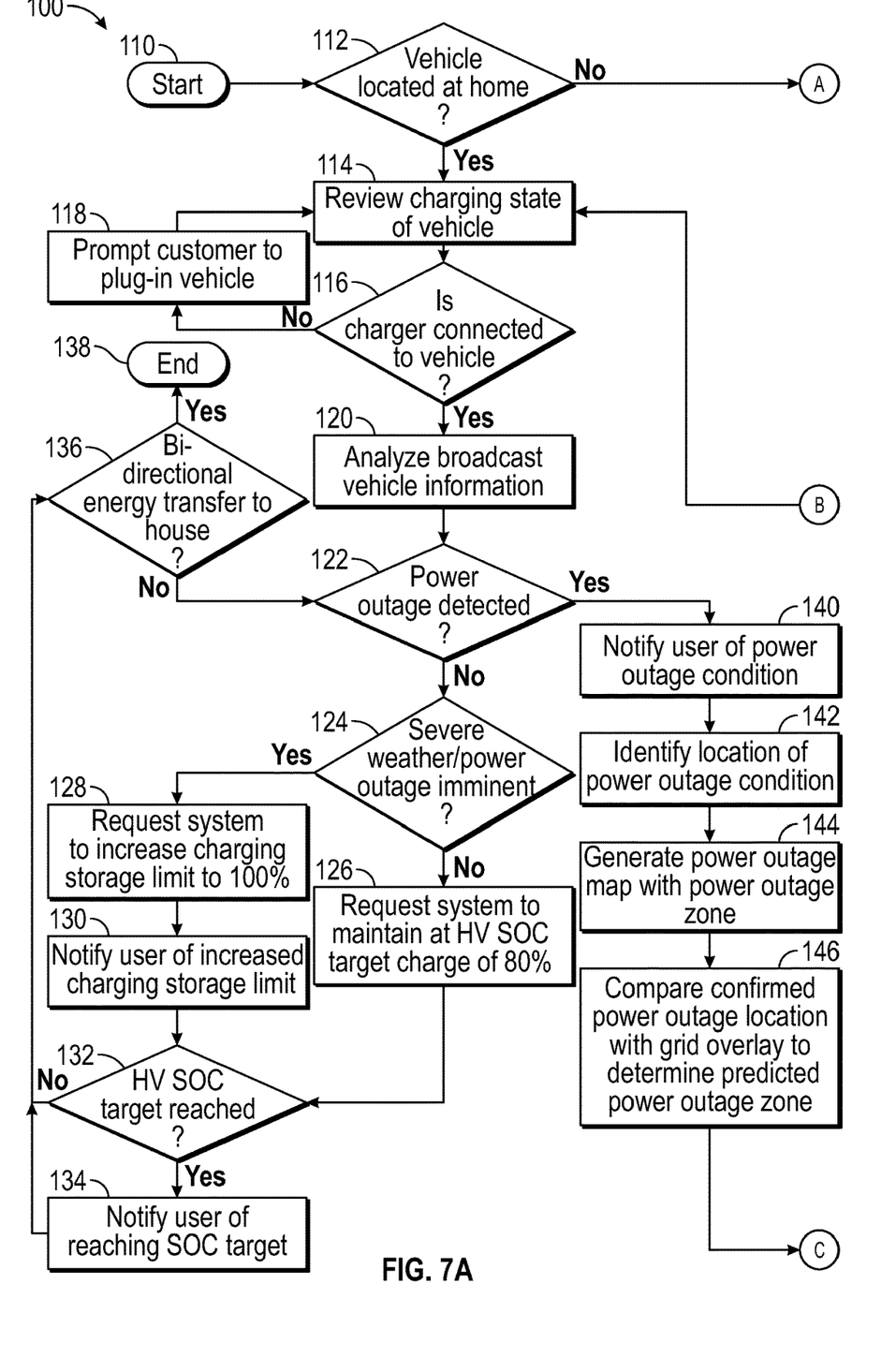
FIGS. 7A and 7B illustrate a flow chart of an exemplary method for coordinating and providing aggregated power outage mapping as part of bidirectional energy transfer sequences.
Figure 7B:
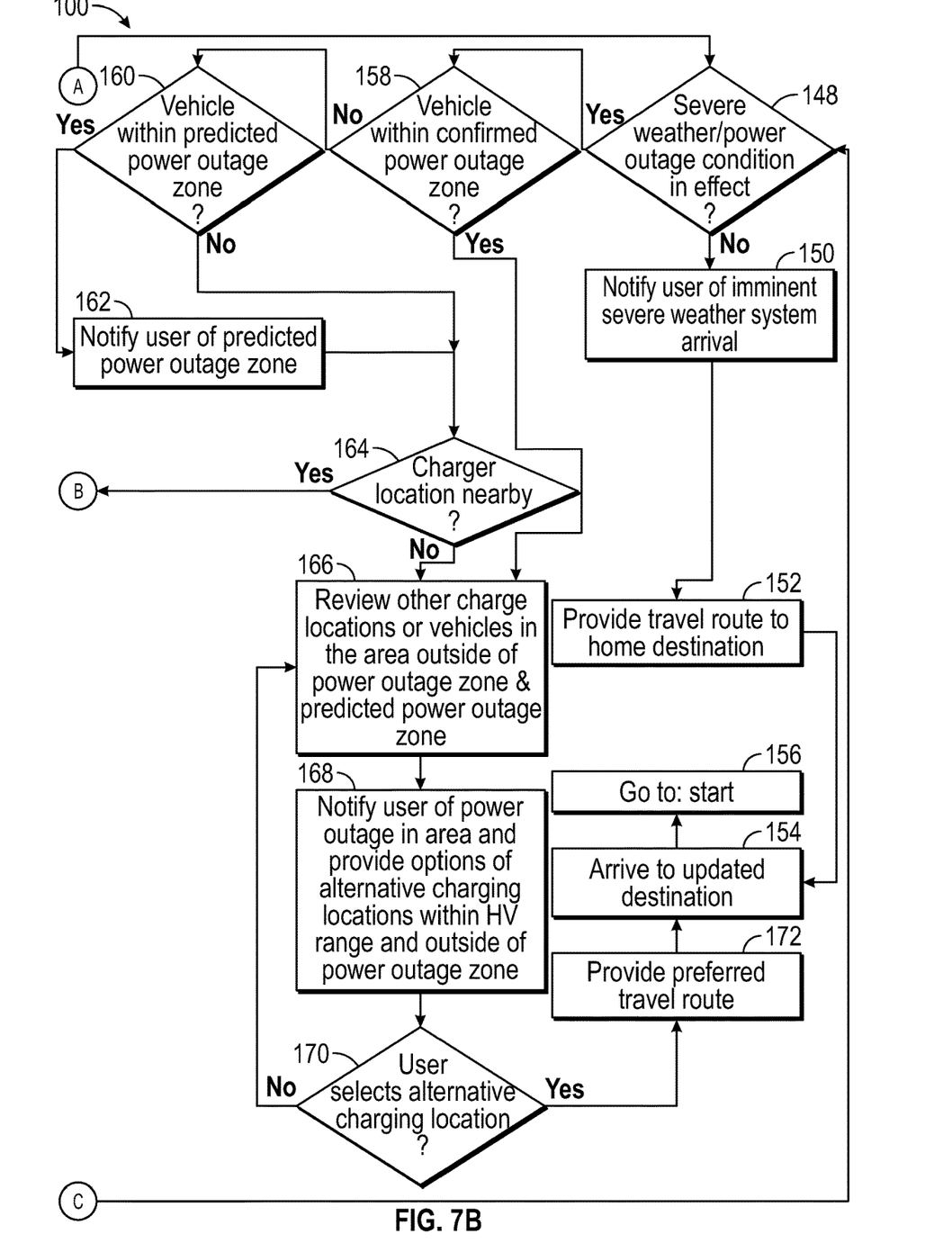

FIGS. 7A and 7B, with continued reference to FIGS. 1-6, schematically illustrates in flow chart form an exemplary method 100 for controlling the system 10 for coordinating and providing aggregated power outage mapping and/or strategic charging guidance as part of bidirectional energy transfer sequences. The system 10 may be configured to employ one or more algorithms adapted to execute at least a portion of the steps of the exemplary method 100. For example, the method 100 may be stored as executable instructions in the memory 83 of the control module 80, and the executable instructions may be embodied within any computer readable medium that can be executed by the processor 81 of the control module 80. The method 100 could alternatively or additionally be stored as executable instructions in the respective memories of the control module 46 of the electrified vehicle 12 and/or the control module 106 of the structure 14.

The exemplary method 100 may begin at block 110. At block 112, the method 100 may determine whether the electrified vehicle 12 is currently located at its home location, which may be at the structure 14 in some implementations. If YES, the method 100 may proceed to block 114 by reviewing the charging state of the electrified vehicle 12. This may include analyzing the energy transfer status information 78 of the vehicle information 56, for example.

Next, at block 116, the method 100 may determine whether or not the electrified vehicle 12 is plugged-in (e.g., whether the charge cable 24 is currently connected to the charge port assembly 26 of the electrified vehicle 12 and the EVSE 22). If NO, the user of the electrified vehicle 12 may be prompted to plug-in the electrified vehicle 12 at block 118. Alternatively, if a YES flag is returned at block 116, the method 100 may proceed to block 120 by further analyzing the vehicle information 56 in anticipation of providing aggregated power outage mapping and/or strategic charging guidance functionalities.

The method 100 may next determine whether a power outage has been detected at block 122. This determination may be made, for example, by analyzing the heartbeat status signals of the vehicle information 56. If a NO flag is returned at block 122, the method 100 may determine whether severe weather/power outage conditions are imminent at block 124. Predicting the potential for the severe weather/power outage conditions may include assessing the likelihood of occurrence of a power outage associated with the grid power source 32. The control module 80 may be programmed to predict the potential for the power outage condition based on the likelihood of severe weather at the location of the structure 14 or the electrified vehicle 12, how soon the severe weather is predicted to arrive, and/or various other information that may be obtained from a weather data server associated with the server system 48. The prediction may further be based on historical weather logs, storm category information, etc.

If severe weather/power outage conditions are not imminent, the method 100 may proceed to block 126 by commanding the system 10 to maintain the traction battery pack 16 at a predefined SOC target (e.g., 80% SOC or some other predefined SOC target). Alternatively, if severe weather/power outage conditions are determined to be imminent at block 124, the method 100 may proceed to block 128 by commanding the system 10 to temporarily increase the charging storage limit of the traction battery pack 16 to 100% to allow for a greater amount of energy to be stored in the traction battery pack 16 in anticipation of the expected severe weather/power outage conditions. The user of the electrified vehicle 12 may be notified of the increased charging storage limit at block 130 of the method 100, such as by displaying one or more messages on the HMI 44 or the personal electronic device 58, for example.

From either block 126 or 130, the method 100 may proceed to block 132. At this step, the method 100 may determine whether the SOC target of the traction battery pack 16 has been reached. If YES, the method 100 may notify the user of the electrified vehicle 12 that the SOC target has been reached at block 134. If NO, the method 100 may proceed to block 136 by confirming with the user whether a bidirectional energy transfer from the electrified vehicle 12 to the structure 14 should be performed. If YES, the method 100 may end at block 138. If NO, the method 100 may return to block 122 for further actions and analysis.

If a YES flag is returned at block 122, thus indicating a detected power outage at the location of the electrified vehicle 12, the method 100 may notify the user of the power outage condition at block 140. The user of the electrified vehicle 12 may be notified of the power outage condition by displaying one or more messages on the HMI 44 and/or the personal electronic device 58, for example.

Next, at block 142, the location of the power outage condition may be identified. For example, location data from the vehicle information 56 can be leveraged to identify the charging location where the electrified vehicle 12 is currently being charged. Alternatively, the location data of the structure 14 can be identified via direct communications between the control module 106 of the structure 14 and the control module 80 of the server system 48.

At block 144, the method 100 may, in response to detecting the power outage condition, generate the power outage map 82. Generating the power outage map 82 may include defining the power outage zone 90 within the street map 84. The power outage zone 90 may be demarcated in a first colored shading, such as red, for example.

Next, at block 146, the method 100 may compare the power outage location with the grid overlay 86 of the power outage map 82 to determine the predicted power outage zone 96, which may then also be defined within the street map 84. The predicted power outage zone 96 may be demarcated in a second colored shading, such as amber, for example, as part of block 146.

The method 100 may next proceed to block 148 from either block 146 or when a NO flag is returned at block 112. At this step, the method 100 may confirm whether the severe weather/power outage condition remains in effect. If NO, the method 100 may notify the user of the electrified vehicle 12 that the severe weather/power outage condition could be imminent at block 150. As part of the notification, the user may be provided with the distance required to travel back to the structure 14, the probability of arriving at the structure 14 before the severe weather/power outage occurs, the probability of charging to 100% before the severe weather/power outage arrives, etc. The method 100 may then provide a travel route for returning to the structure 14 at block 152. When the electrified vehicle 12 has arrived at the structure 14 at block 154, the method 100 may return to the start block 110 as shown schematically at block 156.

If a YES flag is returned at block 148, the method 100 may proceed to block 158 instead of block 150. At this step, the method 100 may determine whether the electrified vehicle 12 is currently located in a confirmed power outage zone. This determination may include comparing location data from the vehicle information 56 associated with the electrified vehicle 12 with power outage maps that have been generated from information received from other vehicles that are operably linked to the system 10.

If the electrified vehicle 12 is not in one of the confirmed power outage zones at block 158, the method 100 may determine whether the electrified vehicle 12 is in a predicted power outage zone at block 160. If YES, the method 100 may notify the user of the predicted power outage zone at block 162. This step may include, for example, providing the user with the power outage map 82 that includes both the power outage zone 90 and the predicted power outage zone 96. If NO, the method 100 may determine whether there are nearby charging locations at block 164. If YES, the method 100 may return to block 114 for continued action and analysis.

If either a NO flag is returned at block 164 or a YES flag is returned at block 158, the method 100 may proceed to block 166 by reviewing other charging locations and/or other electrified vehicles capable of performing bidirectional energy transfers that are located in the area outside of the power outage zone 90. The method 100 may then, at block 168, notify the user of the power outage in the area and provide alternative options for charging that are both within the available travel range of the electrified vehicle 12 and located outside of the power outage zone 90 and the predicted power outage zone 96.

The method 100 may confirm whether the user has selected an alternative charging location at block 170. If NO, the method 100 may return to block 166 for further action and analysis. If YES, the method 100 may proceed to block 172 by providing a preferred travel route for traveling to the selected charging location. The travel route may additionally include an estimated time of arrival for reaching the selected charging location and/or provide the option for making a charging reservation at the charging location. When the electrified vehicle 12 has arrived at the selected destination at block 154, the method 100 may return to the start block 110 as shown schematically at block 156.

The bidirectional energy transfer systems of this disclosure are designed to coordinate bidirectional energy transfer events and provide aggregated power outage mapping functionalities during power outage conditions. By leveraging real time, crowd sourced vehicle information, the proposed systems may facilitate the seamless integration of power outage mapping and strategic charging notifications with little to no required manual input. The proposed systems may further provide the strategic charging options in both confirmed and likely power outage conditions, thereby improving user satisfaction.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A bidirectional energy transfer system, comprising:
   an electrified vehicle configured to broadcast vehicle information that includes at least a location and a charging status of the electrified vehicle; and
   a server system in communication with the electrified vehicle and configured to receive the vehicle information,
   wherein the server system includes a control module programmed to generate a power outage map when the charging status indicates a power outage condition,
   wherein the control module is further programmed to increase a charging storage limit of a traction battery pack of the electrified vehicle in response to predicting that the power outage condition is imminent.

2. The system as recited in claim 1, wherein the power outage map includes a power outage zone and a predicted power outage zone identified within a street map of the power outage map.

3. The system as recited in claim 2, wherein the power outage zone is demarcated by a first type of shading and the predicted power outage zone is demarcated by a second type of shading that is different from the first type of shading.

4. The system as recited in claim 2, wherein the control module is further programmed to infer the predicted power outage zone based on branches of a power grid overlay that are located downstream from the power outage zone within the street map.

5. The system as recited in claim 1, wherein the control module is further programmed to automatically communicate the power outage map to a service provider of a grid power source for indicating the location of the power outage condition.

6. The system as recited in claim 1, wherein the power outage map is an aggregated power outage map generated based on the charging status of the electrified vehicle and a second charging status of a second electrified vehicle.

7. The system as recited in claim 1, wherein the control module is further programmed to communicate the power outage map to a second electrified vehicle that is located near a power outage zone that is identified within the power outage map.

8. The system as recited in claim 1, wherein the vehicle information is periodically broadcast from the electrified vehicle in the form of heartbeat status signals.

9. The system as recited in claim 1, wherein the control module is further programmed to:
   notify a user of the electrified vehicle when the location of the electrified vehicle is within a power outage zone or a predicted power outage zone of the power outage map; and
   provide a list of available charging locations for charging the electrified vehicle or provide travel route instructions for guiding the user back to a home location associated with the electrified vehicle.

10. The system as recited in claim 1, wherein the control module is programmed to command the traction battery pack to be charged to a first charging storage limit when the power outage condition is not imminent.

11. The system as recited in claim 10, wherein the control module is programmed to command the traction battery pack to be charged to a second, larger charging storage limit when the power outage condition is imminent.

12. A method, comprising:
   receiving vehicle information associated with an electrified vehicle;
   detecting, based at least on the vehicle information, whether a power outage condition is occurring at a location of the electrified vehicle;
   generating a power outage map in response to detecting the power outage condition,
   determining whether the power outage condition is imminent;
   charging a traction battery pack of the electrified vehicle to a first charging storage limit when the power outage condition is not imminent; and
   charging the traction battery pack to a second, larger charging storage limit when the power outage condition is imminent.

13. The method as recited in claim 12, wherein generating the power outage map includes:
   identifying a power outage zone of the power outage map with a first type of shading; and
   identifying a predicted power outage zone of the power outage map with a second type of shading that is different from the first type of shading.

14. The method as recited in claim 13, wherein identifying the predicted power outage zone includes:

inferring the predicted power outage zone based on branches of a power grid overlay that are located downstream from the power outage zone within the power outage map.

15. The method as recited in claim 12, comprising:
automatically communicating the power outage map to a service provider of a grid power source.

16. The method as recited in claim 12, comprising:
communicating the power outage map to a second electrified vehicle that is located near a power outage zone that is identified within the power outage map.

17. The method as recited in claim 12, wherein the vehicle information is periodically broadcast from the electrified vehicle in the form of heartbeat status signals.

18. The method as recited in claim 12, comprising:
notifying a user of the electrified vehicle when the electrified vehicle is within a power outage zone or a predicted power outage zone of the power outage map; and providing a list of available charging locations for charging the electrified vehicle.

19. The method as recited in claim 12, comprising:
notifying a user of the electrified vehicle when the electrified vehicle is within a power outage zone or a predicted power outage zone of the power outage map; and providing travel route instructions for guiding the user back to a home location associated with the electrified vehicle.

20. The method as recited in claim 12, comprising:
providing a strategic charging guidance notification to a user of the electrified vehicle in conjunction with providing the power outage map.

* * * * *